US011463592B2

(12) United States Patent
Hamabe et al.

(10) Patent No.: US 11,463,592 B2
(45) Date of Patent: Oct. 4, 2022

(54) IMAGE PROCESSING APPARATUS, METHOD, AND COMPUTER PROGRAM PRODUCT EXCLUDES SPECIFIC ANOMALIES AMONG DETECTED ANOMALIES

(71) Applicant: KYOCERA Document Solutions Inc., Osaka (JP)

(72) Inventors: Rui Hamabe, Osaka (JP); Kazunori Tanaka, Osaka (JP); Kanako Morimoto, Osaka (JP); Takuya Miyamoto, Osaka (JP); Koji Sato, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 17/555,928

(22) Filed: Dec. 20, 2021

(65) Prior Publication Data
US 2022/0210278 A1    Jun. 30, 2022

(30) Foreign Application Priority Data

Dec. 28, 2020    (JP) .............................. JP2020-218474

(51) Int. Cl.
*H04N 1/00*    (2006.01)
(52) U.S. Cl.
CPC ..... *H04N 1/00082* (2013.01); *H04N 1/00005* (2013.01); *H04N 1/0009* (2013.01); *H04N 1/00015* (2013.01); *H04N 1/00037* (2013.01); *H04N 1/00068* (2013.01)

(58) Field of Classification Search
CPC .......... H04N 1/00005; H04N 1/00015; H04N 1/00029; H04N 1/00034; H04N 1/00037; H04N 1/00039; H04N 1/00068; H04N 1/00082; H04N 1/0009; H04N 1/409; H04N 1/58; G06T 7/0002; G06T 2207/30144
See application file for complete search history.

(56) References Cited

U.S. PATENT DOCUMENTS

2020/0111199 A1*  4/2020  Ikeda .................. G06T 7/11
2022/0084183 A1*  3/2022  Sakuyama ........... G01N 21/88
2022/0210277 A1*  6/2022  Hamabe ............... H04N 1/409

FOREIGN PATENT DOCUMENTS

JP    2017-223892    12/2017

* cited by examiner

*Primary Examiner* — Scott A Rogers

(57) ABSTRACT

An image processing apparatus includes an anomaly detecting unit configured to detect anomalies included in a target image; and an anomaly exclusion processing unit configured to exclude a specific anomaly among the detected anomalies. Further, the anomaly exclusion processing unit excludes one of an anomaly and another anomaly among the detected anomalies, if (a) a detection area of the anomaly, a detection area of the other anomaly, and an overlapping area of the detection areas of the anomaly and the other anomaly satisfy a predetermined condition and (b) a type of the anomaly and a type of the other anomaly are different from each other.

6 Claims, 4 Drawing Sheets

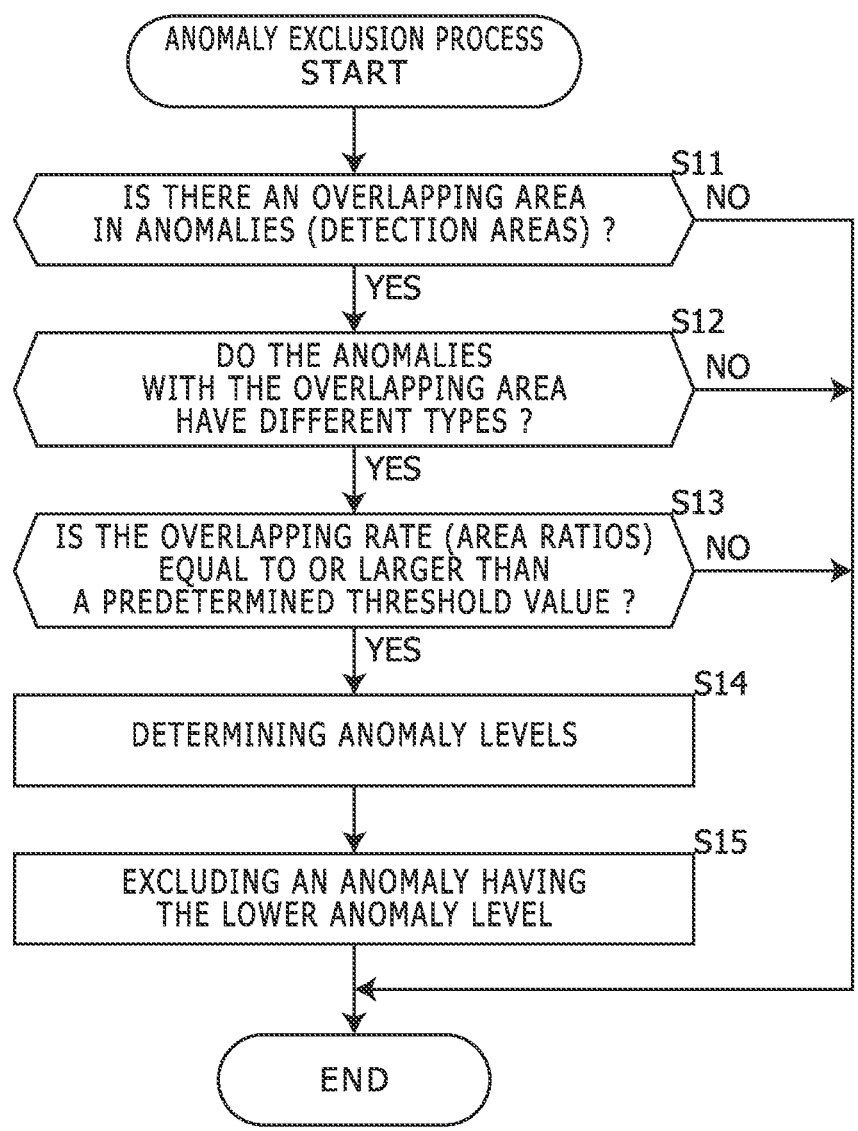

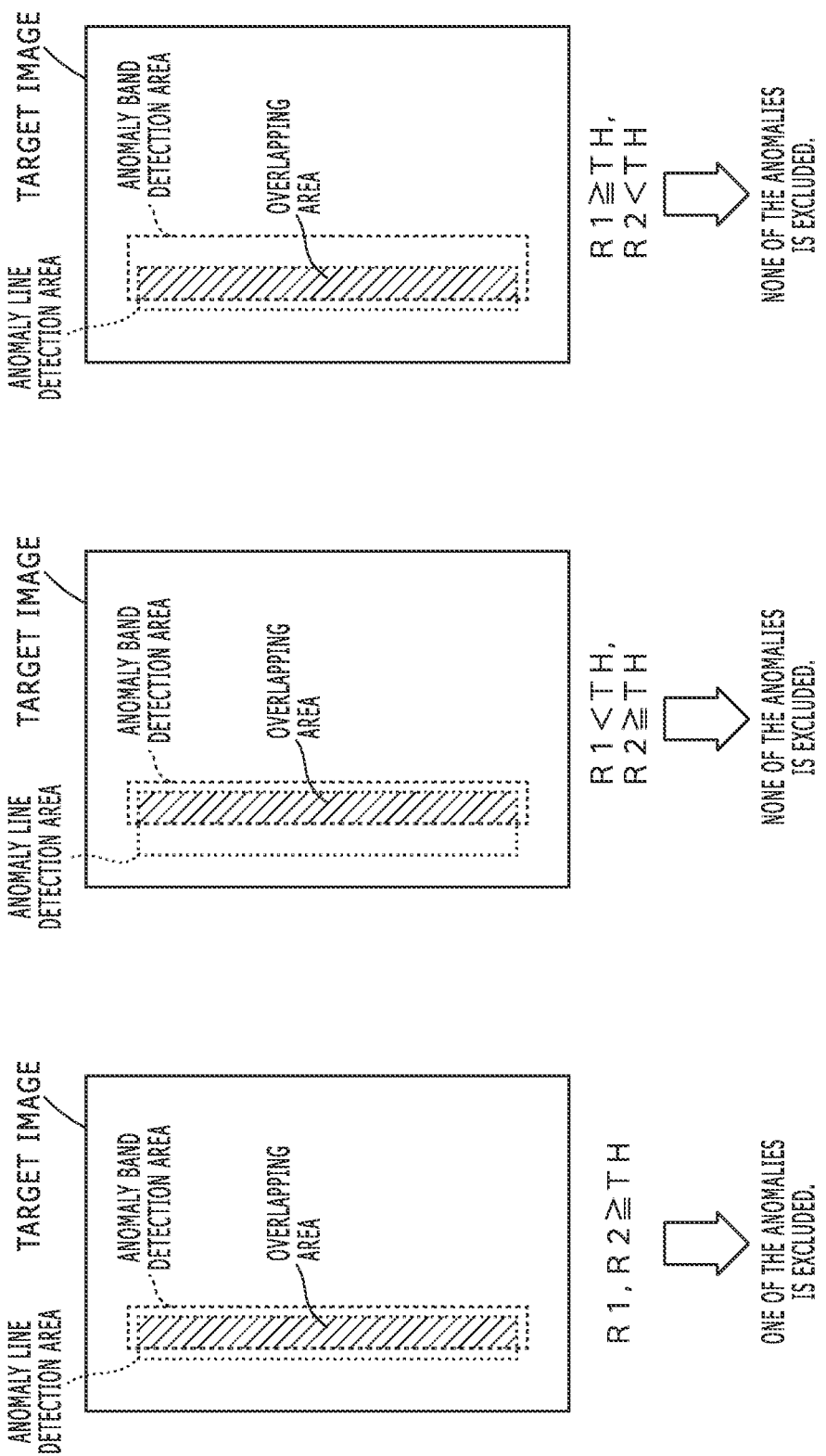

IMAGE PROCESSING APPARATUS, METHOD, AND COMPUTER PROGRAM PRODUCT EXCLUDES SPECIFIC ANOMALIES AMONG DETECTED ANOMALIES

CROSS-REFERENCE TO RELATED APPLICATIONS

This application relates to and claims priority rights from Japanese Patent Application No. 2020-218474, filed on Dec. 28, 2020, the entire disclosures of which are hereby incorporated by reference herein.

BACKGROUND

1. Field of the Present Disclosure

The present disclosure relates to an image processing apparatus, an image processing method, and a non-transitory computer readable recording medium storing an image processing program.

2. Description of the Related Art

On the basis of an image obtained by scanning a printed matter outputted by an image forming apparatus such as multi function peripheral or printer, an image processing apparatus detects anomalies such as unintended line, dot and/or density unevenness that appear on the printed matter, and estimates a cause of each of the anomalies.

In general, if it is set such that an anomaly is easily detected, overdetection occurs, and consequently, an image that is not an anomaly may be detected as an anomaly in error. Even though the aforementioned image processing apparatus detects an anomaly, the detection result may include an overdetected anomaly (i.e. false anomaly). In addition, a post process such as estimation of cause of an anomaly is performed even for such false anomaly, which results in unnecessary computation cost.

SUMMARY

An image processing apparatus according to an aspect of the present disclosure includes an anomaly detecting unit configured to detect anomalies included in a target image; and an anomaly exclusion processing unit configured to exclude a specific anomaly among the detected anomalies. Further, the anomaly exclusion processing unit excludes one of an anomaly and another anomaly among the detected anomalies, if (a) a detection area of the anomaly, a detection area of the other anomaly, and an overlapping area of the detection areas of the anomaly and the other anomaly satisfy a predetermined condition and (b) a type of the anomaly and a type of the other anomaly are different from each other.

An image processing method according to an aspect of the present disclosure includes an anomaly detecting step that detects an anomaly included in a target image; and an anomaly exclusion step that excludes a specific anomaly among the detected anomaly. Further, in the anomaly exclusion step, one of an anomaly and another anomaly is excluded among the detected anomalies, if (a) a detection area of the anomaly, a detection area of the other anomaly, and an overlapping area of the detection areas of the anomaly and the other anomaly satisfy a predetermined condition and (b) a type of the anomaly and a type of the other anomaly are different from each other.

A non-transitory computer readable recording medium according to an aspect of the present disclosure stores an image processing program, and the image processing program causes a computer to act as the aforementioned anomaly detecting unit and the aforementioned anomaly exclusion processing unit.

These and other objects, features and advantages of the present disclosure will become more apparent upon reading of the following detailed description along with the accompanied drawings.

BRIEF DESCRIPTION OF THE DRAWINGS

FIG. 3 shows a flowchart that explains the anomaly exclusion process (Step S3) in FIG. 2; and FIG. 4 shows a diagram that explains the example of the anomaly exclusion process (Step S3) in FIG. 2.

DETAILED DESCRIPTION

Hereinafter, an embodiment according to an aspect of the present disclosure will be explained with reference to drawings.

Figure 1:
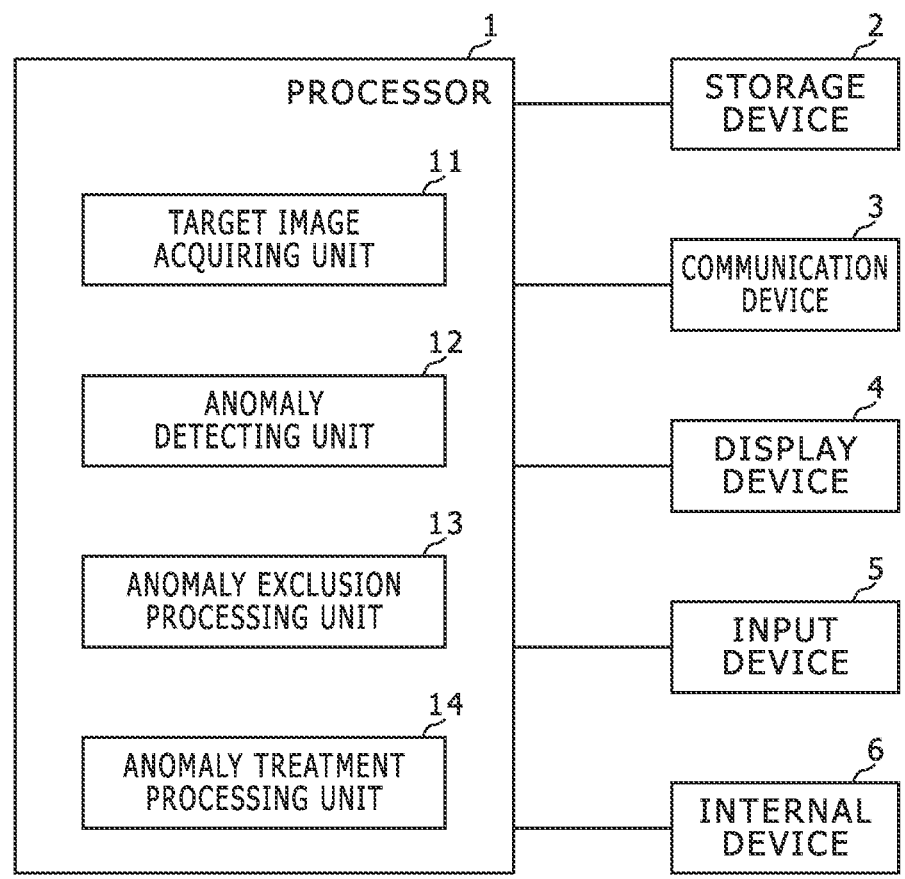
FIG. 1 shows a block diagram that indicates a configuration of an image processing apparatus according to an embodiment of the present disclosure.

FIG. 1 shows a block diagram that indicates a configuration of an image processing apparatus according to an embodiment of the present disclosure. An image processing apparatus shown in FIG. 1 is an information processing apparatus such as personal computer or server, or an electronic apparatus such as digital camera or image forming apparatus (scanner, multi function peripheral or the like), and includes a processor 1, a storage device 2, a communication device 3, a display device 4, an input device 5, an internal device 6 and the like.

The processor 1 includes a computer and executes an image processing program using the computer and thereby acts as sorts of processing units. Specifically, the computer includes a CPU (Central Processing Unit), a ROM (Read Only Memory), a RAM (Random Access Memory) and the like, loads the image processing program stored in a non-transitory computer readable recording medium such as the ROM or the storage device 2 to the RAM, executes the image processing program using the CPU and thereby acts as predetermined processing units. Further, the processor 1 may include an ASIC (Application Specific Integrated Circuit) that acts as a specific processing unit.

The storage device 2 is a non-volatile storage device such as flash memory, and stores the image processing program and data required for a process mentioned below. The image processing program is, for example, stored in a non-transitory computer readable recording medium and installed into the storage device 2 from the recording medium.

The communication device 3 is a device that performs data communication with an external device, such as network interface or a peripheral device interface. The display device 4 is a device that displays sorts of information to a user, such as a display panel of a liquid crystal display. The input device 5 is a device that detects a user operation, such as keyboard or touch panel.

The internal device 6 is a device that performs a specific function of this image processing apparatus. For example, if this image processing apparatus is an image forming apparatus, the internal device 6 is an image scanning device that optically scans a document image from a document, a printing device that prints an image on a print sheet, or the like.

Here, the processor 1 acts as a target image acquiring unit 11, an anomaly detecting unit 12, an anomaly exclusion processing unit 13, and an anomaly treatment processing unit 14, as the aforementioned processing units.

The target image acquiring unit 11 acquires a target image (image data) from the storage device 2, the communication device 3, the internal device 6 or the like, and stores the target image into the RAM or the like.

The anomaly detecting unit 12 detects an anomaly included in the acquired target image in accordance with an existent method. In this embodiment, for example, the anomaly detecting unit 12 detects an anomaly using a filter (second derivative filter, Gabor filter or the like) and generates characteristic information of the detected anomaly. Specifically, an anomaly is detected on the basis of a characteristic amount (filter output) obtained by applying the filter to the input image (target image).

The characteristic information includes (a) a position and a size of the anomaly (a position and a size of a detection area mentioned below), (b) a type of the anomaly (such as line, band or dot), and (c) an anomaly level corresponding to an output value of the filter when the anomaly is detected. For example, when a density difference between the anomaly and a periphery of the anomaly is large, the anomaly level gets high.

The anomaly exclusion processing unit 13 excludes a specific anomaly among the detected anomalies. Specifically, the anomaly exclusion processing unit 13 excludes one of an anomaly and another anomaly among the detected anomalies, if (a) a detection area of the anomaly, a detection area of the other anomaly, and an overlapping area of the detection areas of the anomaly and the other anomaly satisfy a predetermined condition and (b) a type of the anomaly and a type of the other anomaly are different from each other.

It should be noted that the detection area is a rectangle area including an anomaly, and determined by the anomaly detecting unit 12.

In this embodiment, if the type of the anomaly and the type of the other anomaly are different from each other, the anomaly exclusion processing unit 13 selects one of the anomaly and the other anomaly on the basis of the aforementioned anomaly levels, and excludes the selected anomaly among the detected anomalies. Specifically, the anomaly having the lower anomaly level is excluded in the anomaly and the other anomaly.

Further, in this embodiment, the anomaly exclusion processing unit 13 (a) derives an area A of a detection area of the aforementioned anomaly (specifically, a product of a pixel number of its width and a pixel number of its height), an area B of a detection area of the aforementioned other anomaly, and an area C of an overlapping area of the detection areas of the aforementioned anomaly and the other anomaly, and (b) excludes one of the anomaly and the other anomaly, if (b1) area ratios $R1$, $R2$ between the overlapping area and the detection areas of the anomaly and the other anomaly ($R1=C/A$, $R2=C/A$) satisfy a predetermined condition (here, both of $R1$ and $R2$ are equal to or larger than a predetermined threshold TH) and (b2) a type of the anomaly and a type of the other anomaly are different from each other.

For example, types of the aforementioned anomaly and the other anomaly are line anomaly and band anomaly. Therefore, for example, this anomaly exclusion process is performed for a line anomaly and a band anomaly that have an overlapping area among the detected anomalies.

The anomaly treatment processing unit 14 performs a predetermined anomaly treatment process for the detected anomaly (except for the excluded anomaly). For the excluded anomaly, the anomaly treatment process is not performed. The anomaly treatment process is notification of the detected anomaly (such as message transmission from the communication device 3 or displaying a message on the display device 4 to an operator who is engaged in maintenance or determination of a malfunction part corresponding to the detected anomaly), automatic determination of a malfunction part corresponding to the detected anomaly, an automatic maintenance operation, and/or the like.

Figure 2:
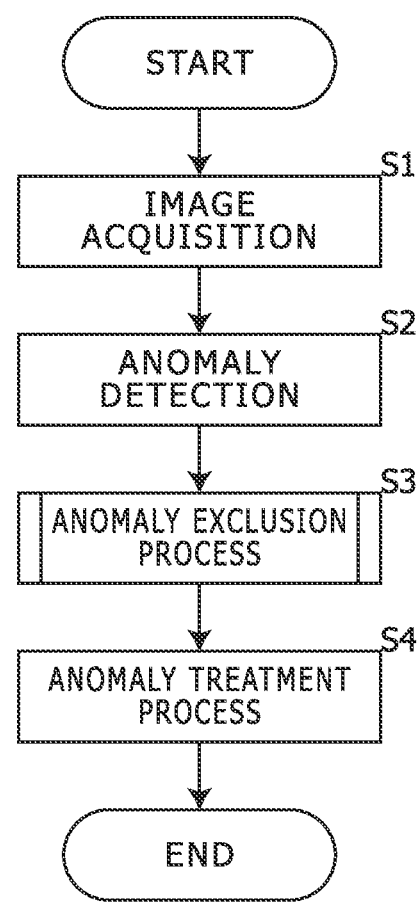
FIG. 2 shows a flowchart that explains a behavior of the image processing apparatus shown in FIG. 1.

The following part explains a behavior of the image processing apparatus in FIG. 1. FIG. 2 shows a flowchart that explains a behavior of the image processing apparatus shown in FIG. 1.

Firstly, the target image acquiring unit 11 acquires a target image (image data) (in Step S1). Subsequently, the anomaly detecting unit 12 detects an anomaly included in the acquired target image, generates characteristic information (position-and-size information, type, anomaly level, and the like) of the detected anomaly, and stores the characteristic information into the RAM or the like (in Step S2).

Subsequently, the anomaly treatment processing unit 14 performs the anomaly exclusion process that excludes a specific anomaly among the detected anomalies (in Step S3).

The anomaly treatment processing unit 14 performs the predetermined anomaly treatment process for the detected anomaly (except for the excluded anomaly).

Here explained is the anomaly exclusion process in Step S3. FIG. 3 shows a flowchart that explains the anomaly exclusion process (Step S3) in FIG. 2. FIG. 4 shows a diagram that explains the example of the anomaly exclusion process (Step S3) in FIG. 2.

Firstly, the anomaly exclusion processing unit 13 determines whether there is an overlapping area in anomalies (detection areas) among the detected anomalies (in Step S11). Specifically, the anomaly exclusion processing unit 13 selects the detected anomalies in turn and determines whether a part or a whole of a detection area of the selected anomaly overlaps with a detection area of any other anomaly or not on the basis of the aforementioned characteristic information, and thereby detects a pair of two anomalies (detection areas) that have an overlapping area.

Subsequently, if a pair of such two anomalies that have an overlapping area is detected, the anomaly exclusion processing unit 13 determines whether types of these two anomalies that have an overlapping area are different from each other or not (in Step S12).

If it is determined that the types of these two anomalies that have an overlapping area are different from each other, then the anomaly exclusion processing unit 13 calculates the aforementioned area ratios $R1$, $R2$ on these two anomalies that have an overlapping area, and determines whether both of the area ratios $R1$, $R2$ are equal to or larger than the threshold TH or not (in Step S13).

If it is determined that both of the calculated area ratios $R1$, $R2$ are equal to or larger than the threshold TH, the anomaly exclusion processing unit 13 determines anomaly levels of these two anomalies on the basis of the aforementioned characteristic information (in Step S14), and excludes the anomaly having the lower anomaly level among these two anomalies (in Step S15).

As mentioned, a specific anomaly is excluded from the detected anomalies. If no overlapping areas are detected of anomalies having different types in Steps S11 and S12, and if at least one of the area ratios R1, R2 on the overlapping area is less than the threshold value TH in Step S13, then the exclusion of an anomaly is not performed.

For example, as shown in FIG. 4, regarding a line anomaly and a band anomaly that have an overlapping area, if both of the area ratios R1, R2 are equal to or larger than the threshold value TH, then one of these anomalies is excluded, but if one or both of the area ratios R1, R2 is/are less than the threshold value TH, the exclusion is not performed.

As mentioned, in the aforementioned embodiment, the anomaly detecting unit 12 detects anomalies included in a target image. The anomaly exclusion processing unit 13 excludes a specific anomaly among the detected anomalies. Further, the anomaly exclusion processing unit 13 excludes one of an anomaly and another anomaly among the detected anomalies, if (a) a detection area of the anomaly, a detection area of the other anomaly, and an overlapping area of the detection areas of the anomaly and the other anomaly satisfy a predetermined condition and (b) a type of the anomaly and a type of the other anomaly are different from each other.

Consequently, a false anomaly is excluded from the detected anomalies, and therefore an anomaly is detected at high precision. Further, a computation cost, processing time and the like for the anomaly treatment process are restrained.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the aforementioned threshold value may take different values corresponding to types of anomalies, respectively.

Further, in the aforementioned embodiment, the aforementioned predetermined condition is that the area ratios R1, R2 are equal to or larger than the threshold value; and alternatively, the aforementioned predetermined condition may be set as another condition (for example, a ratio between an area D of union of these two detection areas and the area C of the overlapping area).

Further, in the aforementioned embodiment, the aforementioned image processing program may be stored in a potable recording medium (non-transitory computer readable recording medium), and installed from this recording medium to the storage device 2.

What is claimed is:

1. An image processing apparatus, comprising:
an anomaly detecting unit configured to detect anomalies included in a target image; and
an anomaly exclusion processing unit configured to exclude a specific anomaly among the detected anomalies;
wherein the anomaly exclusion processing unit excludes one of an anomaly and another anomaly among the detected anomalies, if (a) a detection area of the anomaly, a detection area of the other anomaly, and an overlapping area of the detection areas of the anomaly and the other anomaly satisfy a predetermined condition and (b) a type of the anomaly and a type of the other anomaly are different from each other.

2. The image processing apparatus according to claim 1, wherein
the anomaly detecting unit detects the anomalies using a filter and generates characteristic information of each of the anomalies;
the characteristic information includes a type of the anomaly and an anomaly level corresponding to an output value of the filter when the anomaly is detected; and
if the type of the anomaly and the type of the other anomaly are different from each other, the anomaly exclusion processing unit selects one of the anomaly and the other anomaly on the basis of the anomaly levels, and excludes the selected anomaly among the detected anomalies.

3. The image processing apparatus according to claim 1, wherein the anomaly exclusion processing unit excludes one of an anomaly and another anomaly among the detected anomalies, if (a) an area ratio between the overlapping area and the detection areas of the anomaly and the other anomaly satisfies a predetermined condition and (b) a type of the anomaly and a type of the other anomaly are different from each other.

4. The image processing apparatus according to claim 1, wherein the type of the anomaly or the other anomaly is line anomaly or band anomaly.

5. An image processing method, comprising:
an anomaly detecting step that detects an anomaly included in a target image; and
an anomaly exclusion step that excludes a specific anomaly among the detected anomaly;
wherein in the anomaly exclusion step, one of an anomaly and another anomaly is excluded among the detected anomalies, if (a) a detection area of the anomaly, a detection area of the other anomaly, and an overlapping area of the detection areas of the anomaly and the other anomaly satisfy a predetermined condition and (b) a type of the anomaly and a type of the other anomaly are different from each other.

6. A non-transitory computer readable recording medium storing an image processing program,
wherein the image processing program causes a computer to act as an anomaly detecting unit configured to detect an anomaly included in a target image; and an anomaly exclusion processing unit configured to exclude a specific anomaly among the detected anomaly; and
the anomaly exclusion processing unit excludes one of an anomaly and another anomaly among the detected anomalies, if (a) a detection area of the anomaly, a detection area of the other anomaly, and an overlapping area of the detection areas of the anomaly and the other anomaly satisfy a predetermined condition and (b) a type of the anomaly and a type of the other anomaly are different from each other.

* * * * *